(12) United States Patent
Kannan et al.

(10) Patent No.: US 10,192,549 B2
(45) Date of Patent: Jan. 29, 2019

(54) EXTENDING DIGITAL PERSONAL ASSISTANT ACTION PROVIDERS

(71) Applicant: Microsoft Technology Licensing, LLC, Redmond, WA (US)

(72) Inventors: Vishwac Sena Kannan, Redmond, WA (US); Aleksandar Uzelac, Seattle, WA (US); Daniel J. Hwang, Renton, WA (US); Robert L. Chambers, Sammamish, WA (US); David Pinch, Seattle, WA (US); Zachary Thomas John Siddall, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 302 days.

(21) Appl. No.: 14/676,603

(22) Filed: Apr. 1, 2015

(65) Prior Publication Data
US 2016/0155442 A1    Jun. 2, 2016

Related U.S. Application Data

(60) Provisional application No. 62/085,461, filed on Nov. 28, 2014.

(51) Int. Cl.
| | |
|---|---|
| *G10L 15/22* | (2006.01) |
| *G06F 9/50* | (2006.01) |
| *G06F 3/16* | (2006.01) |
| *G06F 9/48* | (2006.01) |

(52) U.S. Cl.
CPC .............. *G10L 15/22* (2013.01); *G06F 3/167* (2013.01); *G06F 9/4881* (2013.01); *G06F 9/5027* (2013.01); *G10L 2015/223* (2013.01)

(58) Field of Classification Search
CPC . G06F 9/4881; G06F 9/5027; G10L 2015/223
See application file for complete search history.

(56) References Cited

U.S. PATENT DOCUMENTS

| | | |
|---|---|---|
| 6,137,862 A | 10/2000 | Atkinson et al. |
| 8,386,929 B2 | 2/2013 | Zaika et al. |
| 8,731,939 B1 | 5/2014 | Lebeau et al. |
| 2003/0101060 A1 | 5/2003 | Bickley et al. |
| 2007/0124740 A1* | 5/2007 | Brunswig ............... G06F 9/541 719/320 |

(Continued)

FOREIGN PATENT DOCUMENTS

| | | |
|---|---|---|
| EP | 2204973 | 7/2010 |
| EP | 2639792 | 9/2013 |
| WO | WO 2013137660 | 9/2013 |

OTHER PUBLICATIONS

Second Written Opinion received in counterpart PCT Application No. PCT/US2015/061718, dated Oct. 28, 2016, 5 pages.

(Continued)

*Primary Examiner* — Qian Yang
(74) *Attorney, Agent, or Firm* — Klarquist Sparkman, LLP

(57) ABSTRACT

An electronic device can receive user input via voice or text that includes tasks to be performed. A digital personal assistant infrastructure service can control to which registered action provider the task is assigned. Per-task action provider preferences can be stored. If a preferred action provider is not able to complete the task, the task can still be performed by a registered action provider that has appropriate capabilities. Machine learning can determine a user's preferences. Resource conservation and effective user interaction can result.

20 Claims, 11 Drawing Sheets

(56) References Cited

U.S. PATENT DOCUMENTS

| | | | |
|---|---|---|---|
| 2007/0192818 A1* | 8/2007 | Bourges-Sevenier | ....................... H04L 12/2803 725/132 |
| 2008/0113661 A1 | 5/2008 | Repka | |
| 2010/0296394 A1* | 11/2010 | Krzanowski | ........ H04L 12/4625 370/228 |
| 2011/0223893 A1 | 9/2011 | Lau et al. | |
| 2011/0317211 A1* | 12/2011 | Yamada | .................... G06F 9/50 358/1.15 |
| 2012/0209946 A1 | 8/2012 | McClure et al. | |
| 2013/0165097 A1* | 6/2013 | Fighel | ............... H04M 15/8038 455/417 |
| 2013/0304758 A1 | 11/2013 | Gruber et al. | |
| 2013/0311997 A1 | 11/2013 | Gruber et al. | |
| 2014/0074483 A1 | 3/2014 | Van Os | |
| 2014/0173625 A1 | 6/2014 | Kumar et al. | |
| 2014/0195243 A1* | 7/2014 | Cha | ......................... G06F 3/167 704/270.1 |
| 2014/0222436 A1 | 8/2014 | Binder et al. | |
| 2015/0039292 A1* | 2/2015 | Suleman | ............... G06F 17/289 704/9 |

OTHER PUBLICATIONS

International Preliminary Report on Patentability received in counterpart PCT Application No. PCT/US2015/061717, dated Jan. 31, 2017, 6 pages.

Wilkiewicz, "The fastest route between voice search and your app," Published on Oct. 29, 2014, available at: http://android-developers.blogspot.in/2014/10/the-fastest-route-between-voice-search.html, 2 pages.

Davies, "Smarter Siri with $3^{rd}$-party app integration could power iWatch," Published on Mar. 5, 2014, available at: http://www.slashgear.com/smarter-siri-with-3rd-party-app-integration-could-power-iwatch-05319592/, 11 pages.

Warren, "The story of Cortana, Microsoft's Siri Killer," Published on Apr. 2, 2014, available at: http://www.theverge.com/2014/4/2/5570866/cortana-windows-phone-8-1-digital-assistant, 15 pages.

Hamburger, "Osito for iPhone: can this minimalist Google Now clone make a splash before the real thing?" Published on Apr. 19, 2013, available at: http://www.theverge.com/2013/4/18/4236584/osito-for-iphone-google-now-app, 6 pages.

"How to change or select which program starts when you double-click a file in Windows XP," support.microsoft.com, Article ID 307589, May 22, 2013, 2 pages.

Jesdanun, "Cortana: Is Microsoft's voice assistant better than Siri" *The Guardian*, Apr. 15, 2014, 4 pages.

"Enabling Cortana," Windows Secrets, windowssecrets.com, Jan.-Feb. 2015, 6 pages.

"Enabling Cortana," Windows Secrets, windowssecrets.com, Feb. 6, 2015, 6 pages.

International Search Report and Written Opinion received in counterpart PCT Application No. PCT/US2015/061718, dated May 31, 2016, 11 pages.

\* cited by examiner

FIG. 5A

```
PROVIDER ID: 134
PROVIDER UTTERED NAME: SKYPE
PROVIDER TYPE: LOCAL APPLICATION

ACTIONS: CALL

SLOTS:
    1. <CONTACT NAME>

PREREQUISITE:
    FOR CONTACT:
        PRESENT(<USER_ID>) = TRUE
```

```
PROVIDER ID: 177
PROVIDER UTTERED NAME: RIDESHARE
PROVIDER TYPE: REMOTE SERVICE

ACTIONS: TAXI

SLOTS:
    1. <START LOCATION> [DEFAULT=GPS]
    2. <DESTINATION LOCATION>

PREREQUISITE:
    <SERVICE UP> = TRUE
```

550

EXTENDING DIGITAL PERSONAL ASSISTANT ACTION PROVIDERS

CROSS-REFERENCE TO RELATED APPLICATIONS

This application claims the benefit of U.S. Patent Application No. 62/085,461, filed on Nov. 28, 2014, which is hereby incorporated herein by reference.

BACKGROUND

Electronic devices now have speech recognition functionality that can provide a variety of features in response to spoken commands. The benefits of such functionality are many. In addition, some devices now provide a digital persona who can respond to user commands or questions in a natural, conversational way, whether by speech or typed text. As a result, users are becoming more comfortable interacting with their devices, and the use of natural language commands is becoming more widespread.

Still, there are some scenarios where natural language command technology falters. So, there remains room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

An embodiment can be a method of controlling which action provider out of a plurality of registered action providers performs a task, the method comprising: receiving a spoken utterance detected by a microphone; performing speech recognition on the spoken utterance, the speech recognition recognizing a task in the spoken utterance; and responsive to recognizing the task and based on stored registrations for the registered action providers and stored task-to-provider association preferences, assigning the task to a particular action provider out of the registered action providers, wherein assigning the task comprises choosing the particular action provider to perform the task and sending instructions to perform the task to the particular action provider.

An embodiment can be implemented as an electronic device comprising: a processor; memory storing a plurality of stored registrations for registered action providers, wherein the stored registrations comprise a stored registration for a particular registered action provider indicating a task supported by the particular registered action provider; memory storing a plurality of stored preferences for registered action providers, wherein the stored preferences comprise a preference indicating a particular registered action provider as preferred for a particular task; a recognition engine configured to recognize a task in a spoken utterance received by a microphone of the device or a typed command received by text input hardware of the device; and a personal digital assistant infrastructure service configured to control to which action provider the task is directed for completion based on the stored registrations and the stored preferences.

An embodiment can be implemented as one or more machine-readable media comprising machine-executable instructions causing an electronic device to perform a method controlling which communication action provider out of a plurality of registered communication action providers perform a communication task supported by a digital personal assistant infrastructure service, the method comprising: performing speech recognition on an utterance, the speech recognition comprising recognizing the supported communication task and a contact name in the utterance; and based on stored registrations for the registered communication action providers, stored action-to-provider association preferences, and availability of contact information for initiating the communication task for the contact name, choosing a particular registered communication action provider, and initiating communication with a contact identified by the contact name using the selected particular registered communication action provider via the supported communication task; wherein choosing a particular registered communication action provider comprises initially considering a first communication action provider, but choosing a second communication action provider responsive to determining that availability of contact information for the first communication action provider is missing.

As described herein, a variety of other features and advantages can be incorporated into the technologies as desired.

BRIEF DESCRIPTION OF THE DRAWINGS

FIGS. 5A and 5B are block diagrams of example registration records.

DETAILED DESCRIPTION

Example 1—Example Overview

Figure 1:
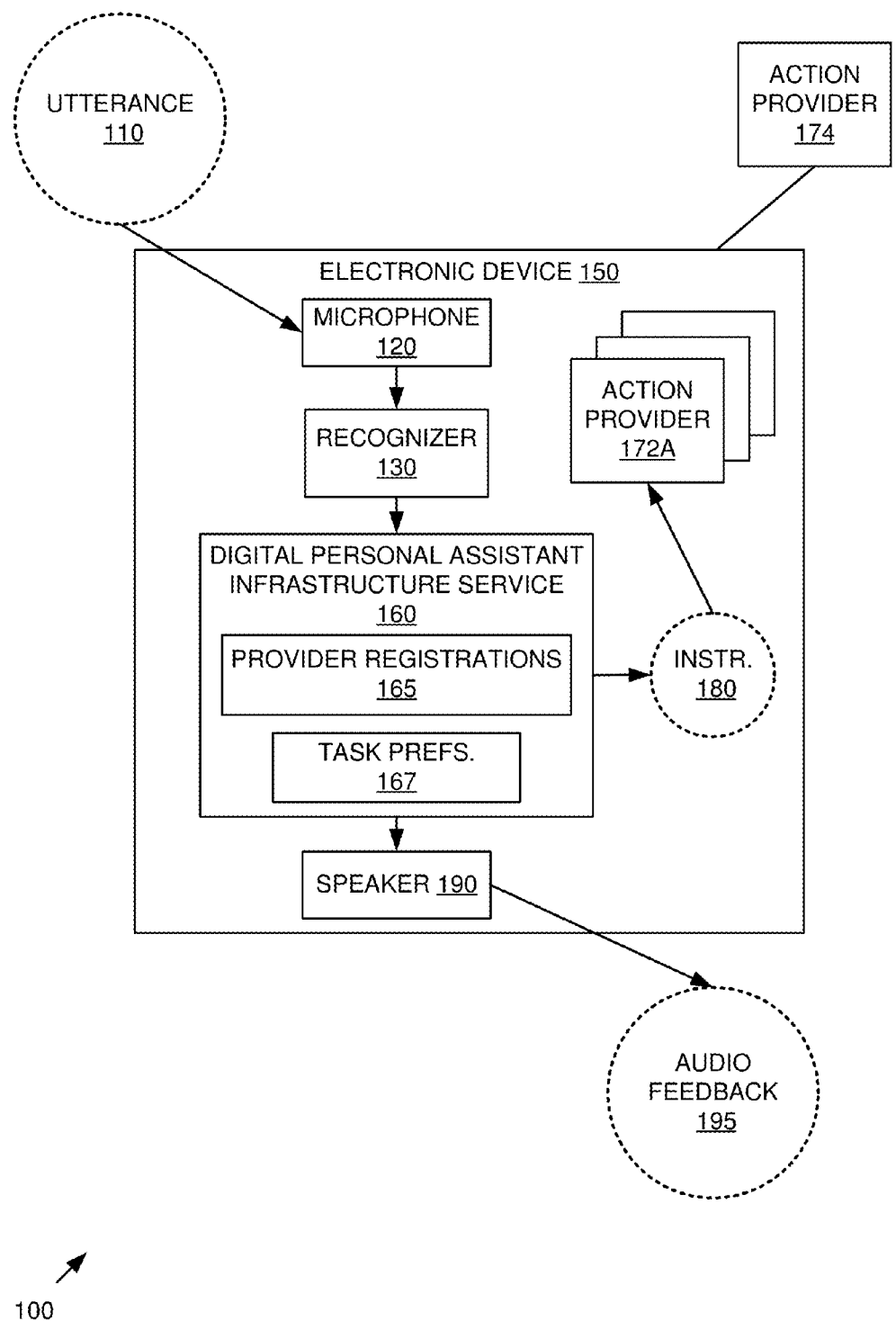
FIG. 1 is a block diagram of an example electronic device configured to control which action provider out of a plurality of registered action providers performs a task.

Various embodiments herein can be used in a variety of scenarios to address a variety of technical challenges, including extensibility, computing resource conservation, improved user efficiency with voice commands, and increased user interaction performance.

In various examples, an action provider can register with a digital personal assistant infrastructure service. Registered action providers can be considered by the infrastructure service when controlling which action provider will perform a task recognized by user input.

Although digital personal assistants can have rich functionality, they can be limited to what was contemplated by their designers. Functionality of a digital personal assistant system can be extended as described herein. Extensibility opens the assistant functionality to a wider variety of participating action providers. For example, third-party action providers may be desired by a user for reasons of increased functionality, personal preference, or the like.

In the absence of a technical solution, action providers separately provide their own digital personal assistant functionality. As a result of sharing infrastructure among action providers as described herein, additional action providers can be added to the system, but such providers need not incorporate their own resources and code for implementing a digital personal assistant or any relevant sub-parts of a digital personal assistant. Therefore, the overall computing resources needed to construct and implement an action provider are reduced. For locally-stored action providers, this means less memory is consumed on the electronic device.

As described herein, a registration process can be used by which a provider can communicate information to the digital personal assistant infrastructure service that the service can use when assigning tasks to action providers. Such information can include supported actions, slots to be filled, prerequisites, and the like.

Machine learning as described herein can ultimately result in faster overall task execution.

Various features herein can address these issues so that an overall superior user experience and better use of resources can result.

Various other features can be implemented and combined as described herein.

Example 2—Example Efficient User Interface with Devices and Other Effects

As described in the examples herein, services of a digital personal assistant infrastructure service can be shared among action providers. As a result, the overall amount of storage required to store the action providers can be reduced. In the case of local action providers, memory to store the local action providers can be reduced.

In addition, the number and type of action providers that can make use of the digital personal assistant are expanded. Such an open approach to participation by other action providers can lead to richer functionality provided by an electronic device.

Different users can have different preferences regarding which action provider they wish to use when completing tasks. As described herein, a digital personal assistant infrastructure service can allow any number of action providers to register with the service to take advantage of (e.g., plug in to) the functionality provided by the service, including user preferences, slot filling, prerequisites, machine learning, and the like.

Example 3—Example System Implementing Technologies

FIG. 1 is a block diagram of an example electronic device 150 configured to control which action provider out of a plurality of registered action providers 172A-N, 174 performs a task. In the example, the electronic device 150 has listening (e.g., speech recognition) capabilities, but the device 150 can also implement the technologies with text input hardware.

In the example, the electronic device 150 comprises a microphone 120, a speaker 190, and can have a plurality of other hardware sensors. A recognizer 130 can recognize a spoken utterance 110 received by the microphone 120. As described herein, such an utterance 110 can comprise a task name, task parameters, and the like. In text-entry-based systems, the recognizer can be a recognition engine that recognizes a task in a typed command received by text input hardware of the device (e.g., keyboard, touchscreen, or the like).

The digital personal assistant infrastructure service 160 can act on recognized tasks, orchestrate performance of such tasks, and provide audio feedback 195 via the speaker 190, which can take the form of any of a variety of audio output devices. It thus can control to which action provider a task is directed for completion based on the stored registrations 165 and stored task preferences 167 as described herein.

As described herein, the digital personal assistant infrastructure service 160 can send instructions 180 to a particular action provider out of the action providers 172A-N N, 174 to perform recognized tasks. The digital personal assistant infrastructure service 160 can determine which action provider 172A-N, 174 to use based on a variety of factors. For example, a user default action provider, explicitly specified action provider, or inferred action provider (e.g., based on prior usage) can be chosen.

The stored provider registrations 165 can indicate a variety of information for the action providers 172A-N, 174 and indicate capabilities of the action providers. For example, supported tasks, parameter slots to be filled, prerequisites, and the like can be included. An action provider that has a stored registration is considered to be registered action provider (e.g., registered with the digital personal assistant infrastructure service).

The task preferences 167 can include a mapping between tasks supported by the service and a particular action provider that supports a task. Thus, a default or preferred action provider for a task can be indicated. As described herein, machine learning can be employed to modify the action provider indicated for a particular task. As described herein, preferences can be granular beyond the task level. For example, a preferences for a particular contact, geographical location, or the like can be supported.

The digital personal assistant infrastructure service 160 can choose which out of the plurality of registered action providers 172A-N, 174 is to perform a recognized task based on a variety of inputs (e.g., provider registrations 165, stored task preferences 167, explicitly specified provider, inferred provider, and the like).

Although various components are shown in separate boxes, in practice, component boundaries may vary. For example, the components can be provided as part of a device operating system, application, appliance, or the like. Other arrangements are possible while still implementing the technologies. For example, although the registrations 165 and preferences 167 are shown separately, an optimization can be implemented where the two are merged, or parts of one are duplicated in the other, or the like. For example, information from the registrations 165 can be placed so that it can be easily accessed when finding a default action provider via the preferences 167 (e.g., in the same record or the like).

In practice, the systems shown herein, such as system 100, can be more complicated, with additional functionality, more inputs, outputs, and the like. In practice, additional functionality related to location (e.g., GPS, indoor positioning technology, or the like) can be included to determine a current location of a device that hears a spoken command.

The system 100 and any of the other systems described herein can be implemented in conjunction with any of the hardware components described herein, such as the computing systems or mobile devices described below (e.g., comprising one or more processors, memory, and the like). In any of the examples herein, the inputs, outputs, preferences, registrations, action providers and instructions can be stored in one or more computer-readable storage media, machine-readable media, or computer-readable storage devices. The technologies described herein can be generic to the specifics of operating systems or hardware and can be applied in any variety of environments to take advantage of the described features.

Figure 2:
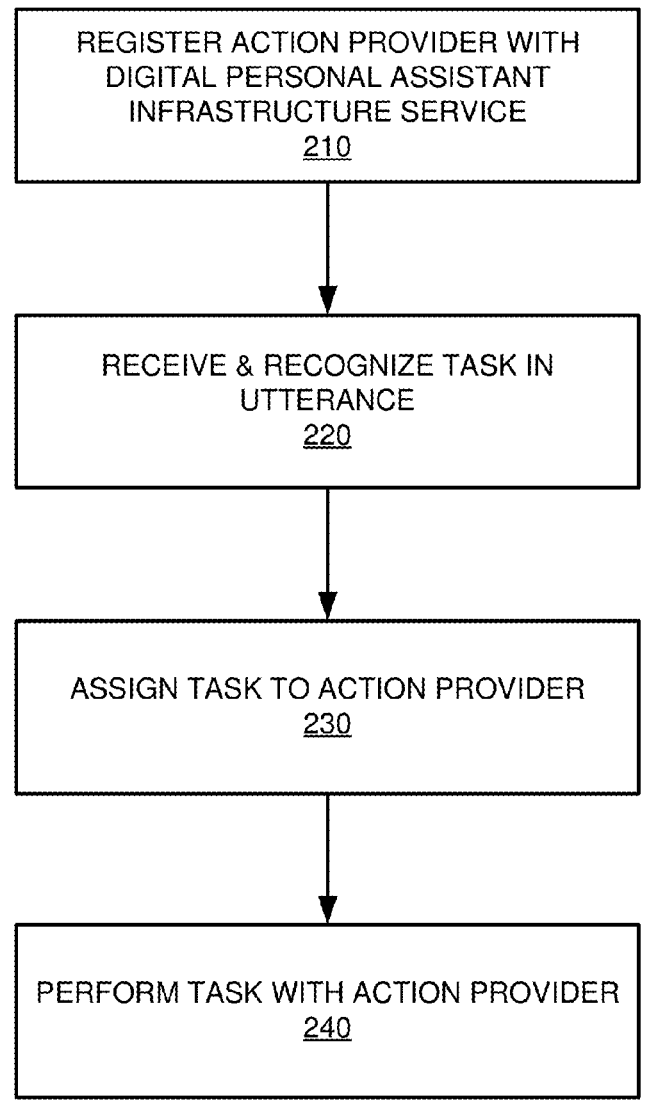
FIG. 2 is a flowchart of an example method of extending digital personal assistant action providers.

Example 4—Example Method Implementing Extending Digital Personal Assistant Action Providers FIG. 2 is a flowchart of an example method 200 of extending digital personal assistant action providers and can be implemented, for example, in the system shown in FIG. 1.

At 210, an action provider is registered with the digital personal assistant infrastructure service. Registering a particular action provider with a digital personal assistant infrastructure service can comprise storing an indication of one or more actions supported by the particular action provider. In practice, additional registration information can be included as described herein. For example, a contract specification mechanism can be used to indicate what information is expected by an action provider when performing a task.

At 220, a task is received and recognized in an utterance by the electronic device.

Additional actions as described herein can be performed, such as determining that a parameter slot is missing, a prerequisite is not fulfilled, or the like.

At 230, based on the registrations and preferences as described herein, the task is assigned to a particular action provider. As described herein, an explicit override of a preferred action provider can be accomplished.

At 240, the particular action provider performs the task.

The method 200 and any of the other methods described herein can be performed by machine-readable or computer-executable instructions (e.g., causing a computing system to perform the method when executed) stored in one or more computer-readable media (e.g., storage or other tangible media), stored in one or more machine-readable media, or stored in one or more computer-readable storage devices. Such methods can be performed at least in part by any of the computing systems or devices described herein (e.g., a mobile device, mobile computing device, game console, wearable computing device, laptop computer, tablet, or the like).

Example 5—Example Method Implementing Technologies

Figure 3:
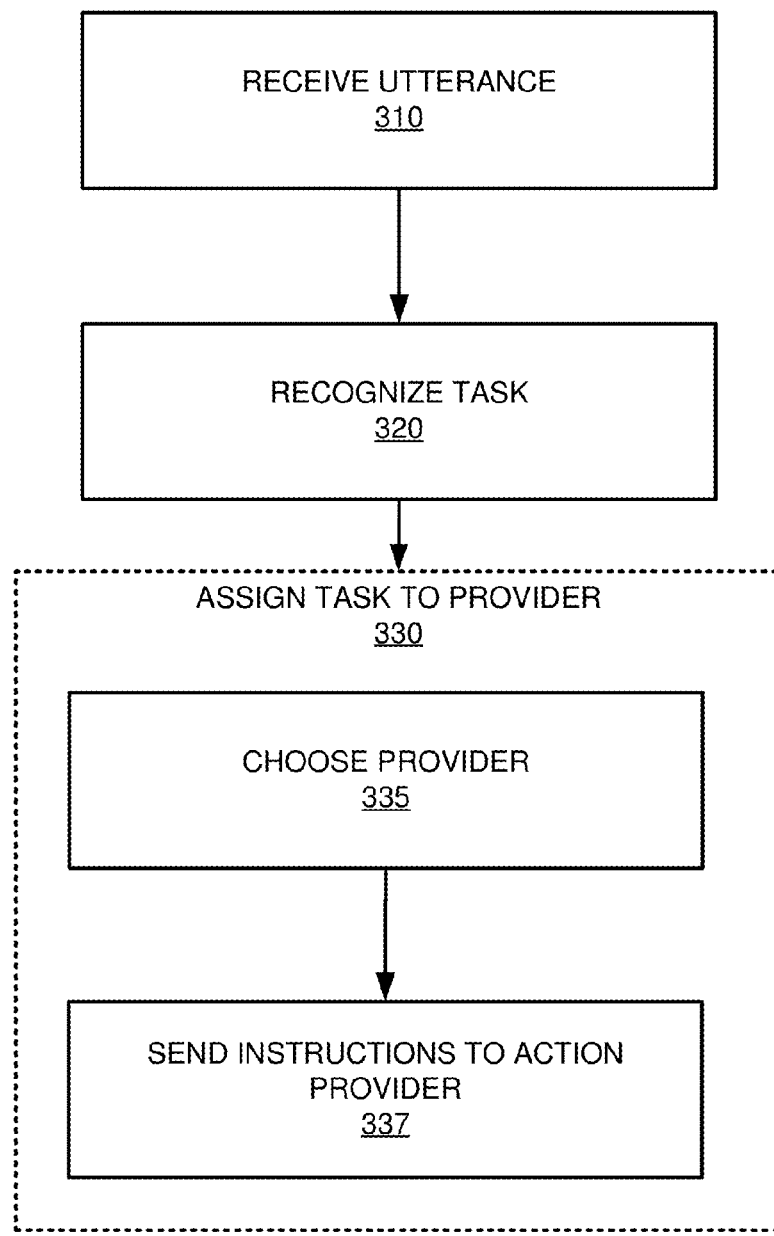
FIG. 3 is a flowchart of an example method of controlling action provider out of a plurality of registered action providers performs a task.

FIG. 3 is a flowchart of an example method 300 of controlling which action provider out of a plurality of registered action providers performs a task and can be implemented, for example, in the system shown in FIG. 1. The method 300 can be performed independently or in conjunction with that shown for extending action providers in FIG. 2 (e.g., to perform 220 and 230 of FIG. 2). Registration (box 210) can take place before the method 300 is performed.

At 310, a spoken utterance is received (e.g., by a microphone of an electronic device, detected by a microphone of the electronic device, or the like). The utterance comprises a spoken task.

At 320, speech recognition is performed on the spoken utterance, and the speech recognition recognizes a task in the spoken utterance. In practice, the spoken task is indicated by a task name or keyword. Multiple task names or keywords can be mapped to the same task to allow for typical variations of verbal expression used to indicate the same task.

At 330, responsive to recognizing the task and based on stored registrations for the registered action providers and stored task-to-provider association preferences, the task is assigned to a particular provider.

Assigning the task can include choosing 335 a particular action provider to perform the task and sending 337 instructions to perform the task to the particular action provider. Information for performing the task (e.g., filled slots) can be included in the instructions. The content of the filled slots can be dictated by a contract specification that was indicated during registration of the particular action provider. As described herein, multiple action providers can be registered for the same task, and an action provider can register for more than one task.

As described herein, additional actions regarding slot filling, machine learning, explicit override, or the like can be performed.

Thus, controlling which action provider performs a task can be accomplished as described.

Example 6—Example Tasks

In any of the examples herein, an utterance can comprise one or more tasks that can be recognized by the voice recognition technology and then performed on behalf of the user. Because such tasks are supported by the digital personal assistant infrastructure service, they are sometimes called "digital personal assistant tasks." Tasks can have associated task names that can be chosen as familiar to a user (e.g., "play music," "call mom," "Send an email to Jim," "turn on the kitchen lights," or the like). As shown, a task can include parameters that are included as part of the spoken command phrase.

Actual underlying tasks (sometimes called "task types" or "task categories") can include messaging (e.g., texting, instant messaging, or the like), calling, email, notes (e.g., add a note to self), navigation, calendar (appointments), or the like. Any number of other tasks or actions can be recognized and be supported through registration as described herein (e.g., playing music, weather, taxi service, alarm, reminders, sending flowers, turning on lights, turning on appliances, or the like).

Calling can be defined to encompass both voice and video calls, or they can be considered separate tasks.

In practice, there may be more than one way to specify a task. For example, "Call <contact name>" and "I want to talk to <contact name>" can both be mapped to "call" by the personal digital assistant infrastructure service.

When performing a task, an audio indication can be given (e.g., in the voice of the virtual persona). For example, a phrase such as "OK, playing music" can be sounded. An audio indication of the action provider can also be provided (e.g., "OK, playing music on <service>"). Thus, the user realizes that the task was recognized and is about to be performed, leading to smoother interaction between the user and the devices.

A mechanism for canceling the task (e.g., a "cancel" button or saying "no") can be provided in a user interface so a user can cancel the task.

As described herein, a default application from the list of registered applications can be chosen for specific task types.

Example 7—Example Digital Personal Assistant Infrastructure Service

In any of the examples herein, a digital personal assistant infrastructure service can take the form of a service that provides digital personal assistant functionality for a plurality of action providers. For example, a digital personal assistant infrastructure services can handle voice interaction and choose which particular action provider is to perform a task, even if more than one action provider is registered and supports the task.

As described herein, the digital personal assistant functionality can include conducting a conversation with the user, such as asking for additional information needed to complete a task, inform whether a task was properly recognized, communicate error conditions, or the like.

In practice, the infrastructure can be implemented as a platform into which a variety of other providers can connect via registration as described herein.

Example 8—Example Action Provider

In any of the examples herein, an action provider can take a variety of forms, including local applications, remote (e.g., web-based) applications or services, or the like. The action provider can register with the digital personal assistant infrastructure service as described herein and subsequently be assigned tasks (e.g., in response to user requests), which they then help complete. For example, an application installed on a device can help call someone and thus fulfill a call task.

Such action providers can be either native or non-native, and the systems described herein can support a mix of both native and non-native action providers (e.g., the registered action providers comprise a non-native action provider and a native action provider). Thus, if the digital personal assistant is provided by a first party provider, third party action providers can participate on the electronic device and avail of the services provided by the infrastructure without having to incorporate their own full digital personal assistant functionality.

Example 9—Example Task Preferences

In any of the examples herein, an electronic device can store an association of tasks with preferred action providers. Such preferences can be managed by the digital personal assistant infrastructure service, operating system, or the like.

Thus, the preferences can serve as a mapping between tasks and action providers (e.g., a task is mapped to a preferred action provider). For example, an association between a play music task and a music service indicates that the music service is the preferred action provider for playing music.

Devices can be initially provided (e.g., shipped) with default preferred action providers (e.g., selected from those that are installed, etc.).

A user can modify the preferred action provider designation via a settings graphical user interface, by voice command (e.g., "always call using Skype," "make Skype my default calling application," or the like), or an action provider can be assigned based on prior usage (e.g., history) for the uttering user.

When a task is recognized, it can then be assigned to the preferred action provider if the provider is able to perform the task as described herein. If the preferred action provider is not able, a different provider that has registered for the task can be assigned the task for performance. In this way, the user can still accomplish the task, even if the preferred provider is not able to for whatever reason.

A secondary or further action provider can be specified by preferences. For example, action providers can be ordered by degree of preference.

Example 10—Example Instructions to Perform Task

In any of the examples herein, instructions sent to an action provider to perform a task can include sufficient information to communicate that the action provider is to perform the task. For example, the task name or identifier can be included along with any parameters for performing the task. Upon receipt of the instructions, the action provider can perform the task or determine that further interaction is appropriate before performing the task as described herein.

Example 11—Example Machine Learning

Machine learning can be used in a variety of scenarios. For example, machine learning can create a fixed set of rules (e.g., decision tree, simple heuristic, or the like) that selects a task provider or preferred task provider based on data provided by the task provider application (e.g., without input from the user's actual behavior, such as what the user selected).

Machine learning can be used to create a dynamic set of rules based on a user's interaction with the system. For example, if it is observed that a user is using one specific task provider to complete a task in a specific context (e.g., involving a specific user), the system can learn such behavior and apply it in the future.

Machine learning can also create a dynamic set of rules based on similar users and their interactions with the system. For example, a crowdsourcing technique can be applied.

In practice, machine learning decisions can depend on external factors and their combinations. For example, external factors such as whether Wi-Fi is available, whether 4G/LTG is available, whether GSM is available, whether the user is roaming, whether the data limit for 4G/LTE is reached, or the like can be used to build context for decision making. In addition, there are numerous internal factors that can be used, such as whether a contact is associated with one task provider and not with the other.

Unsupervised machine learning can extrapolate the intent of a user based on similar intents of the same user, or based on the observed similar intents of other similar users.

Machine learning can be used to set preferred action providers. Machine learning can determine that a particular action provider is a preferred action provider for a task, and responsive to such determination, the preferred action provider for the task can be changed to the particular action provider.

For example, if a user consistently and repeatedly explicitly specifies a particular action provider for a task, the action provider can be set as the preferred action provider for the task. For example, specifying an action provider n (e.g., 5 or the like) times in a row for the same task can lead to its being set as the default for the task. Or, a prompt can then be presented by which the user can confirm that it is to be the default. (e.g., "Would you like <provider> to be the default for messaging?"). The user can also be informed that the setting has been made (e.g., "OK. I'm setting <provider> as your preferred provider for messaging. In the future, you can just say 'Send a message' to use <provider>'").

Thus, the system can recognize repeated, consistent usage of a particular action provider for a particular task. Responsive to recognizing such usage, the user preference to indicate the particular action provider can be set (e.g., in preferences) as associated with the particular task (e.g., before the next listening cycle takes place). In the future, the task can be recognized, and controlling which action provider performs the task can choose the particular action provider for the particular task based on the user preference.

Another machine learning feature can be implemented based on action provider correction. For example, if a task begins on a particular device, the user can say, "No, not <provider A>, but <provider B>." The system can record such corrections and treat them similar to the explicit specification of an action provider as above. So, responsive to receiving a provider correction utterance, the system can store an action provider preference for a task.

Machine learning can take task domains into account (e.g., repeatedly consistently specifying a particular provider for tasks in a domain can result in the provider being set as the preferred device for the task domain).

Although examples describe learning a preferred action provider at the task or domain level, it is also possible to do so at finer levels of granularity (e.g., the contact or city level) as described herein. For example, a certain contact may consistently be messaged using a particular action provider that supports messaging, or rides in a certain city can consistently be requested using a particular action provider that supports taxi service. If a particular action provider is determined as preferred for a task and contact, the preferred provider for the task and contact can be changed accordingly.

One of the benefits of machine learning as described herein is that it reduces the number of exchanges and/or amount of information that needs to be supplied to accomplish a task. For example, a user can simply stop explicitly stating an action provider when interacting with a device. The ultimate task can thus be accomplished faster.

Example 12—Example Registration Information

Figure 4:
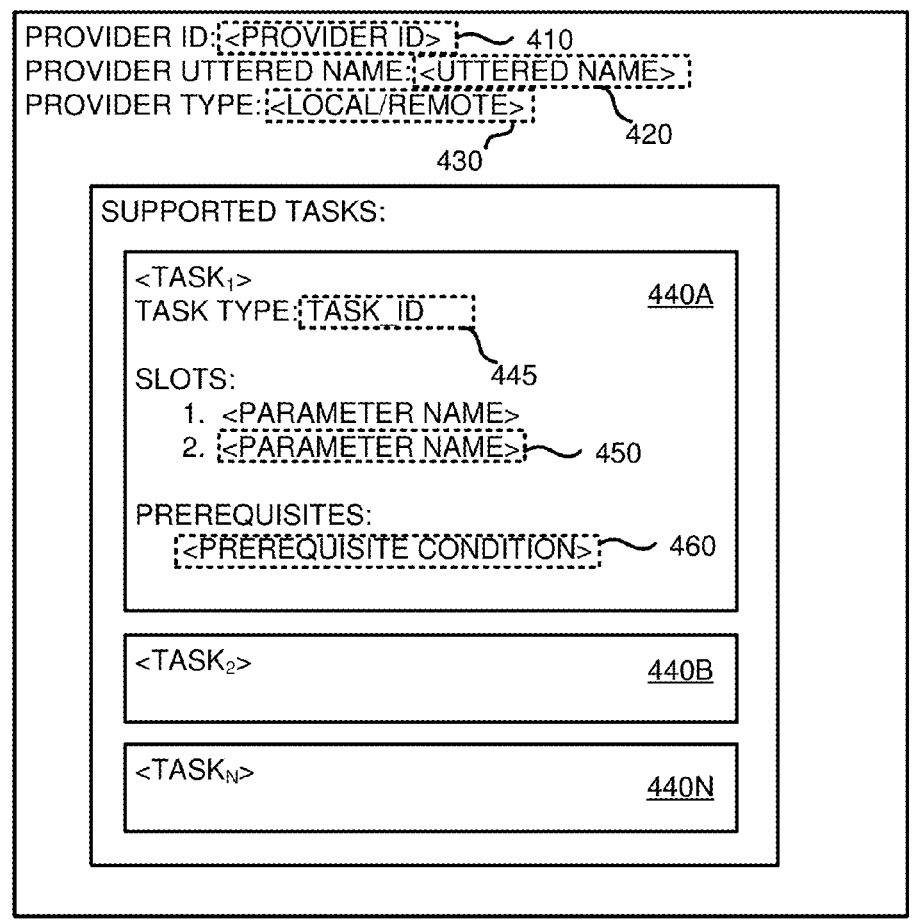
FIG. 4 is a block diagram of an example registration record schema for an action provider that allows action providers to share a digital personal assistant infrastructure service.

In any of the examples herein, an action provider can provide registration information to register with the digital personal assistant infrastructure service. FIG. 4 is a block diagram of an example registration record schema 400 for an action provider that allows action providers to share a digital personal assistant infrastructure service. Capabilities of an action provider can be registered by indicating one or more tasks supported by the action provider and the like. The example shows entry name/value pairs, but other formats can be supported.

In practice, an action provider can communicate registration information to the digital personal assistant infrastructure service (e.g., via an application programming interface) and later update the information as appropriate. A schema can be defined by which registration information is specified.

A provider identifier 410 indicates an identifier for the action provider so that it can be distinguished from other providers during processing. The uttered name 420 can be the name on which speech recognition is performed (e.g., the uttered name can be recognized when spoken). The name 420 can also be used when generating speech (e.g., "OK, calling <contact name> on <uttered name>."). The name 420 can be used as the identifier 410, and/or other names (e.g., display name) can also be included.

A provider type 430 can be used to indicate whether the action provider is local, remote, or the like.

Supported tasks 440A-N can include one or more tasks that the action provider can perform. A supported task can be identified by its task identifier 445.

The slots 450 can indicate one or more parameters (e.g., by name) that are expected to complete the task. For example, a call typically requires a phone number, name, or the like. If a slot is missing, the digital personal assistant infrastructure service can prompt to have the slot filled (e.g., by receiving additional information). Additional information (e.g., a parameter type) can also be specified for a slot. Defaults for slots (e.g., a current GPS location) can be supported. Alternatives can also be supported (e.g., the slot can be filled by an address or name).

A contract mechanism can be supported by which registration can be made available to requesting action providers. When registering with the digital personal assistant infrastructure service, the action provider can register to be a provider for a specific task under a specific version of the contract. There can be one or more contracts that the digital personal assistant infrastructure service can expose per specific task (e.g., callingProviderContract; version=1.0). The contract specifies what information the digital personal assistant will include (e.g., in slots) when invoking the provider to complete an action. Therefore, a service provider can simply indicate the contract specification without having to incorporate functionality for obtaining the information.

A query for contracts supported by the digital personal assistant can be raised by the provider to the digital personal assistant, and a contract supported by the action provider can be selected by the provider. In the case of multiple supported contracts for a single task, a most recent or otherwise preferred one can be selected. In this way, compatibility can be maintained as enhancements are made to the provider and assistant.

For example, the calling contract specification can indicate that the digital personal assistant will include a contact first name value and a contact last name value and optionally also include the current device type, full transcribed user-spoken text, or the like. So, when a provider registers with the digital personal assistant, the provider can specify what it expects when invoked by the digital personal assistant to complete a task.

If a provider cannot resolve a contact based on what the personal assistant provided, it can let the digital assistant know that it cannot be done with an appropriate error message (e.g., which the digital personal assistant can show or speak out to the user). Alternatively, the action provider can decide to directly let the user know that they cannot do what they are being asked to within the action provider experience (e.g., user interface or the like).

The prerequisite conditions 460 can indicate one or more prerequisites before the task can be performed, before the action provider can be invoked, or the like as described herein. The digital personal assistant infrastructure can avoid assigning tasks to action providers if the task registration indicates that a prerequisite is not met.

For a same action provider, the slots 450 and conditions 460 can be different for different tasks. For example, one task may specify a particular slot, while another does not. For example, a contact name slot can be specified as required for both messaging and calling, but the message content slot can be specified as required for only the messaging action provider.

Example 13—Example Contract Implementation

In any of the examples herein, a contract mechanism can be used as part of the registration process for an action provider. For example, an action provider can provide a speech command definition file (e.g., voice command definition XML file or the like) as part of the registration process. The speech command definition file can include the contracts for which the action provider is registering (e.g., contracts that it can consume and process).

Table 1 shows an example of a contract registration. The action provider can call into a platform API and provide the speech command definition file. The digital personal assistant infrastructure service can then build an internal data structure that maps contracts to registered action providers that can consume them. The contracts can be associated with tasks. In this way, a task is ultimately associated with an action provider.

TABLE 1

XML Element for Extending Assistant

<Command Contract="Dial0">
  <Feedback>Showing {options} {msgText}</Feedback>
  <Navigate/>
</Command>

An example of a contract specification and the data it provides is shown in Table 2. The pre-defined contract outlines a set of key:value pairs that the action provider will receive when the contract is invoked. In the example, the action provider will receive two key:value pairs. One is named "ContractId" and the other is "ContactName." In practice, the contract specification can include any of the slot information described herein.

TABLE 2

Pre-defined Contract Specification for Dial0

Semantics for Dial0
[
  ContractId : "Call0"
  ContactName : "John Doe"
]

When the digital personal assistant infrastructure service recognizes a given uttered task, it cross-references the data structure and uses a routing process to choose which action provider should handle it. For example, a task can be recognized, and the associated contracts that fulfill the task can be identified. Choosing from among action providers that can consume the contract can proceed as described herein. The chosen action provider is passed an object structure that provides the contract information (e.g., based on the utterance) to the action provider. When the action provider is launched, it receives both the contract identifier (e.g., which implies a task) and the associated information (e.g., one or more slots). From there, the action provider can determine that it is being invoked to consume a particular contract (e.g., which is associated with a task that was recognized as being uttered by the user).

Example 14—Example Shared Contact Information

In any of the examples herein, action providers can share contact information with the digital personal assistant via a cross-provider-shared contact store. An action provider can add a list of its contact information to the common store. In this way, the user can centrally manage the combined contact information used to communicate with the contacts across several different action providers.

After an action provider submits the list of contacts to the common store, the digital personal assistant can include the contact names for speech recognition purposes (e.g., by specifying the names to a recognizer so the recognizer can more easily recognize an uttered name that is in the list).

Example 15—Example Negative Slots

In any of the examples herein, a negative slot can be specified for situations where there is too much information (e.g., if X is present, take action to correct). Such a scenario can be useful for communications scenarios where specifying a phone type (e.g., "home") is nonsensical. Upon encountering such information, an error message, confirmation, or alternative can be communicated to determine how to proceed (e.g., "I'm sorry, <provider> does not support a home number. Would you still like to start a video call with <contact>?").

Example 16—Example Prerequisites

In any of the examples herein, prerequisites can take a variety of forms that are to be satisfied before the action provider can perform a task. The prerequisites thus function as constraints on the action provider. Failure of a prerequisite condition can prevent the action provider from being assigned tasks. Such constraints can be self-imposed or imposed by the system.

For example, an action provider can specify that a Wi-Fi, data, cellular or other network connection be present before accepting tasks. Similarly, it can be specified that a server be operational (e.g., the system is up). For remote services, one or more such prerequisites can be implied (e.g., it is applied even if it is not present in the registration record).

Other prerequisites include geographical prerequisites (e.g., the device must be within x kilometers of a location, be within a geofence, or the like).

Prerequisites can be specified at finer levels of granularity. For example, a per-contact or per-city prerequisite can be specified (e.g., the task cannot be performed unless a condition is met for a contact). For example, if an action provider identifier of a recognized contact name (e.g., user name required by the action provider) for an action provider is not present, or if a digital certificate is not present, then the task cannot be completed with the action provider.

Similarly, presence information for an action provider can be consulted for a user, and a prerequisite can be that the presence information is of a particular state (e.g., the user is active or available). If the user is not present on the service of the action provider, the prerequisite condition fails.

During processing of tasks, it can be determined that a prerequisite for an action provider is not satisfied. Responsive to such determination, a secondary action provider for the task can be identified and used as the provider for performing the task.

Processing prerequisites can lead to overall faster task execution. For example, the user need not experience failure with a first provider and then choose a second provider to perform the task.

Thus, if an utterance is "Call <contact name>" and there is no phone number for the contact, the preferred provider (e.g., telephone) can fail over to a secondary one (e.g., VOIP) for which there is sufficient contact information (e.g., user identifier) to initiate the call. The opposite situation can also be implemented (e.g., a VOIP provider is preferred, but the user identifier is not available or there is no data network connection).

Prerequisites can thus be particularly helpful with communication action providers. Choosing a particular registered communication action provider can include initially considering a first communication action provider, but choosing a second communication action provider responsive to determining that availability of contact information for the first communication action provider is missing (e.g., not registered, not present in an address book, or the like).

Example 17—Example Registration Records

FIGS. 5A and 5B are block diagrams of example registration records 500, 550.

In the example of 500, a Provider "Skype" is a local application that supports a "call" task. The prerequisite is that there is a user identifier for a contact. In practice, messaging can also be supported, and an additional slot for messaging could be the message itself.

In the example of 550, a provider "Rideshare" is a remote service that supports a taxi task. Because it is a rideshare, the application expects a destination location before performing a task as specified in the slots.

Any number of variations are possible. For example, registration for a flower sending task can indicate that an address or flower provider identifier is a slot to be filled.

A "find me a ride" task can equate to a taxi service. The slot to be filled can be the destination (e.g., "OK. Where would you like to go?"). The pickup location can default to the current location or be specified explicitly (e.g., "Find me a ride from Building 117 to Building 8.")

Example 18—Example Virtual Persona

In any of the examples herein, the technologies can implement a virtual software-based entity whom a user is able to engage from a device with either voice or text input to help accomplish a given task (e.g., send an email to someone, call someone in their address book, etc.).

Such a virtual persona can encourage users to interact with electronic devices in a natural way, leading to a more relaxed voice and therefore more efficient user interaction. Because a virtual persona system can help a user accomplish tasks, it is sometimes called a "digital personal assistant."

Example 19—Example Communication Tasks

In any of the examples herein, a task can be a communication task (e.g., calling, video chat, messaging, emailing, or the like). In practice, such tasks typically include a contact name.

Thus, when speech recognition is performed such on a spoken utterance, a contact name is recognized. In such a case, assigning the particular action provider to perform the task comprises initiating communication with the contact via the communication task with the particular action provider.

Example 20—Example Explicit Action Provider

In any of the examples herein, a chosen application can be explicitly specified by including the name in the utterance or typed text (e.g., "Call mom on Skype"). Thus, the user can chose an application desired to complete a specific task.

The digital personal assistant infrastructure service can thus override the default application and assign the task to the explicitly-specified action provider (e.g., assuming that prerequisites are met and the like).

In such a case, even if a first action provider is specified as preferred for a task, the digital personal assistant infrastructure can receive an utterance comprising an explicit indication of a second action provider and the task, and responsive to recognizing the explicit indication of the second action provider, send instructions to perform the task to the second action provider, regardless of the preferences.

Example 21—Example Task Domains

Figure 6:
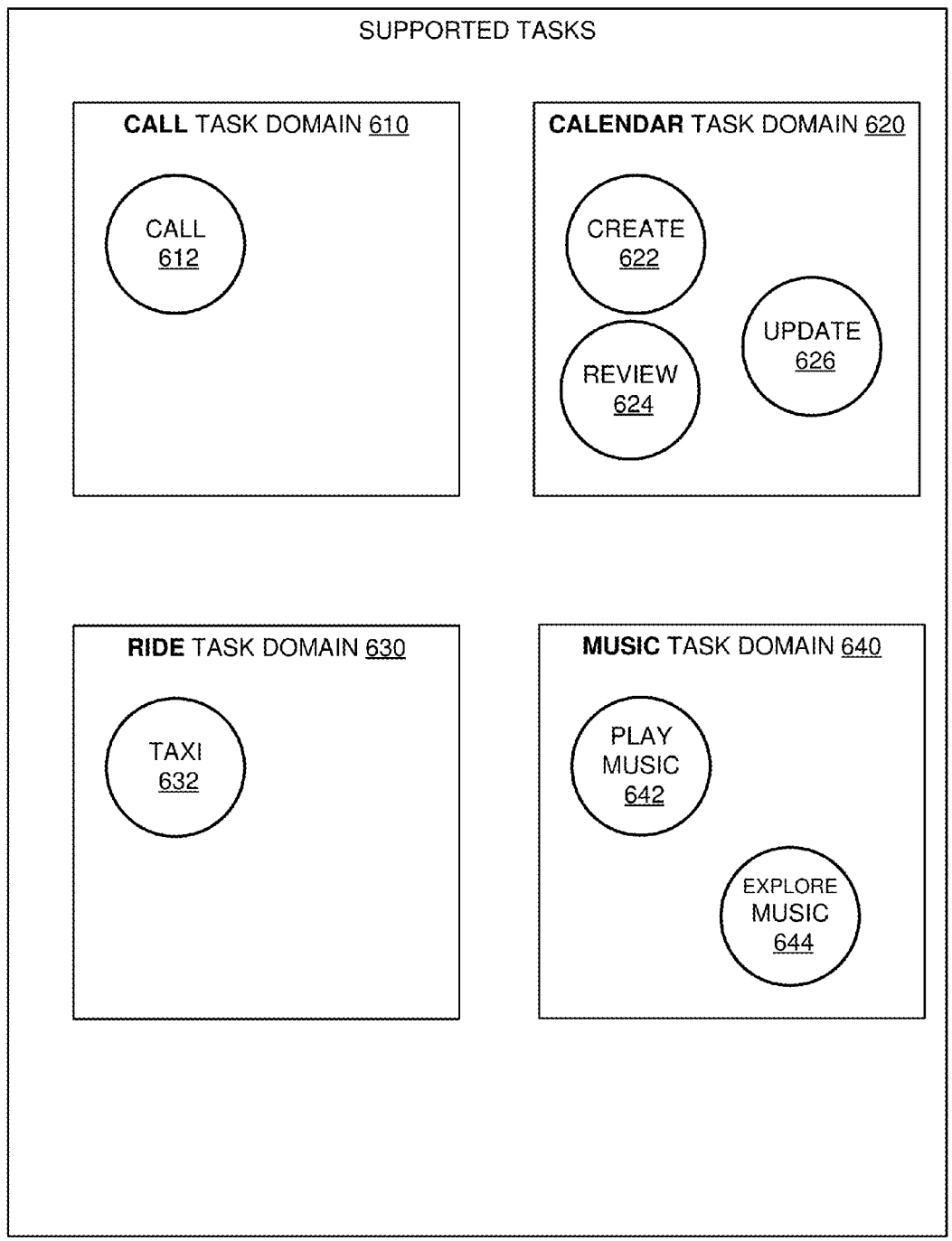
FIG. 6 is a block diagram showing individual tasks for example task domains.

In any of the examples herein, tasks can be grouped into task domains. FIG. 6 is a block diagram showing individual supported tasks 612, 622, 624, 626, 632, 642, 644 grouped into example task domains 610, 620, 630, 640.

For example, tasks 642, 644 related to music can be grouped into a music domain 640, tasks 622, 624, 626 related to calendars (appointments) can be grouped into a calendar domain 620, or the like. Action provider preferences and behavior can be made consistent within a domain. For example, if a user wishes to set a preferred action provider for a particular task or if machine learning changes a preference, such a preference can carry across to other tasks in the same domain.

Similarly, an action provider can register as described herein by providing supported tasks at the domain level instead of or in addition to the individual task level.

Example 22—Example Communication Flow

Figure 7:
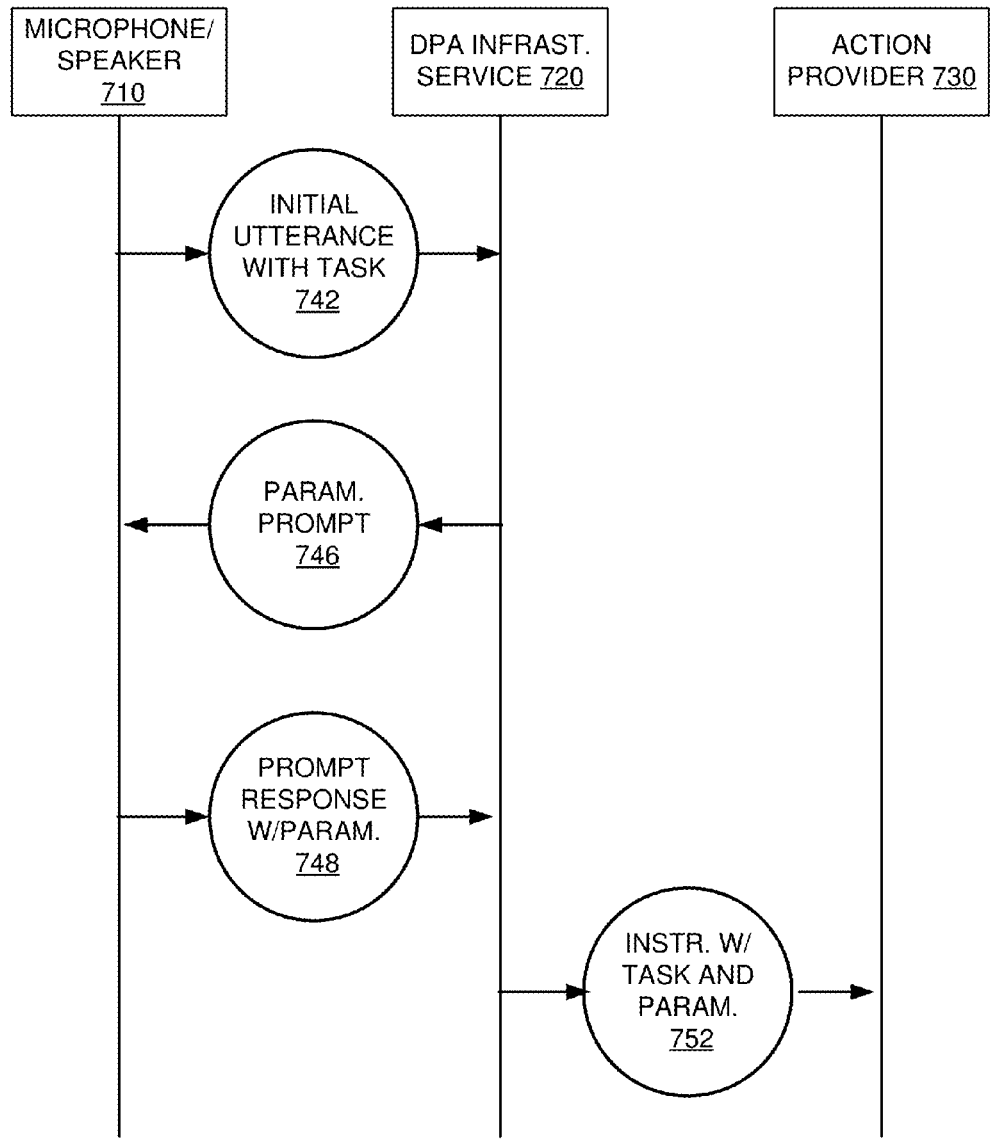
FIG. 7 is a flow diagram showing an example flow of information and instructions between audio devices, a digital personal assistant infrastructure service, and an action provider.

FIG. 7 is a flow diagram 700 showing an example flow of information and instructions between audio devices 710 (microphone, speaker, or the like), a digital personal assistant infrastructure service 720, and an action provider 730.

In any of the examples herein, the process can start with an initial utterance 742 comprising a task name (e.g., "Make a call") that is received by an audio device 710, recognized, and passed to the service 720. The service 720 can determine that a parameter slot for the task is missing based on the stored registration for the particular (e.g., preferred) action provider. Responsive to determining that the parameter is missing, and before sending instructions to perform the task to the particular action provider, a prompt 746 for the parameter value to fill the parameter slot can be sent back to the hardware (e.g., "OK. Who do you want to call?").

An uttered response 748 comprising the prompted parameter (e.g., "Dan") can be received by the audio device 710. Speech recognition can be performed on the utter response, which recognizes a spoken parameter value. The spoken parameter value can then be received by the service 720, which submits it to the particular action provider when assigning the task. The service 720 can package the task and the parameter into instructions 752, which are sent to the action provider 730, which then performs the task (e.g., a call is initiated to the contact named "Dan").

Slot filling can also be based on a contact level of granularity. For example, if a contact has two numbers (e.g., home and work), an additional prompt can be generated to obtain the phone type before sending the instructions 752 to the provider 730. However, such functionality can also be implemented after the action provider 730 is provided instructions 752 by passing the prompt back to the service 720.

In practice, the initial spoken utterance 742 can contain a parameter value. If so, assigning the task to the particular action provider can comprise sending the parameter to the action provider (e.g., without or in addition to performing prompting).

As described herein, a wide variety of scenarios is possible. Via the technologies described herein, the action provider 730 can be relieved of having to include functionality for interacting with the audio devices, providing confirmations, or the like.

As described, the action provider 730 can still request further information (e.g., by further communicating with the service 720, which can generate a prompt and receive an answer), even after the instructions 752 are sent.

Example 23—Example Discoverability

In some cases, there may be no registered action provider that can perform a supported task. Responsive to determining that no registered action provider supports the task, an action provider that supports the task can be identified. For example, a list of providers can be presented to a user for selection. A database of providers can be consulted to find one or more providers that support the task.

The action provider can be installed and registered. Subsequently, the action provider can be assigned the task.

Example 24—Example User Interface

Figure 8:
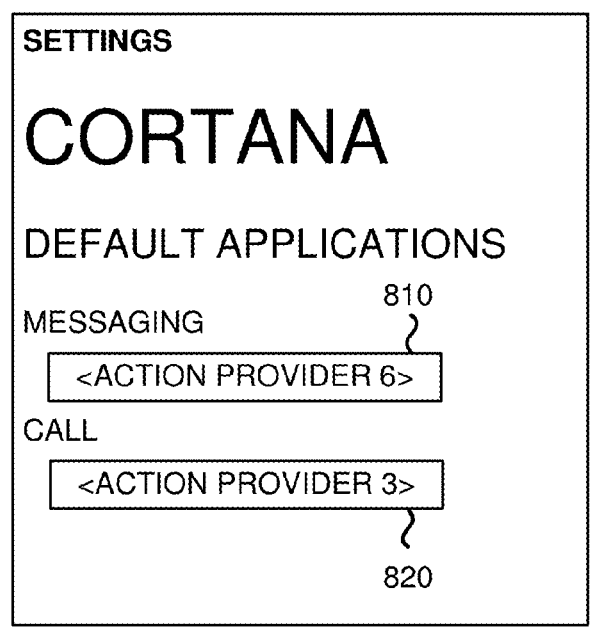
FIG. 8 is a screen shot showing an example user interface for configuring a digital personal assistant to use a third party extension for messaging.
Figure 8:

FIG. 8 is a screen shot showing an example user interface 800 for configuring a digital personal assistant to use a third party extension for messaging.

In the example, a pop-up menu 810 can be used to select action providers that have registered and have indicated in the registration information that they support the "messaging" task. The selected action provider (e.g., action provider 6) can be a third-party action provider as described herein.

Similarly, preferences for other tasks (e.g., "call") can be controlled by the user via other user interface elements (e.g., 820).

The displayed action provider is then used by default when performing the task. Machine learning as described herein can alter the default application. If so, the new default application can be shown in the user interface 800.

Subsequently, when a spoken utterance such as "Message Dan I'm on my way" is received, the digital personal assistant infrastructure service can send a message to the contact "Dan" using the third-party action provider selected via the user interface 800 (e.g., action provider 6).

In any of the examples herein, additional or other user interface features can be provided. For example, a confirmation screen can be shown to confirm the action. Such a screen can show the message "I'm on my way," the contact (e.g., the full contact name, graphical picture from address book, or the like), the action provider being used, and an opportunity to confirm the action. For example, a graphical button for "send" and "cancel" can be shown instead of proceeding directly to sending the message. Audio input (e.g., "send" or "cancel" utterances) can be accepted in lieu of activating the graphical buttons. The user interface can suggest that the user try saying "send" or "send it" thereby providing a hint to the user that audio input can be so used.

Alternatively, the digital personal assistant can simply indicate an intent to proceed and confirm with audio (e.g., "OK. Sending a message to Dan H. on <action provider 6>"). A brief pause can be provided by which the user can cancel if the action was improperly recognized.

Example 25—Example Action Provider Choice Process

As described herein, a default (preferred) action provider can be specified on a per-task basis. Finer levels of granularity allow a default per contact per action (e.g., use one provider when making a call to a first contact, but use a different provider when making a call to a second contact).

Thus, if the task-to-provider association preferences indicate a preferred action provider for a task, choosing the particular action provider to perform the task comprises choosing the preferred action provider for the task.

Explicit specification of an action provider can override the default.

Slots can be filled via conducting a conversation as described herein.

Machine learning as described herein can influence which action provider is selected.

If an action provider is unable to perform the task (e.g., prerequisites are missing), then selection can fall back to a secondary or other provider. Thus, the digital personal assistant infrastructure service can initially consider an action provider (e.g., the preferred one), but then consider and choose a secondary one based on failure of prerequisites.

In some cases, if a provider is the only one that can perform the task, it can be assigned the task.

Example 26—Example Scenarios: Explicit Specification of Action Provider

In any of the examples herein, a wide variety of scenarios can be supported in which the utterance includes explicit specification of an action provider.

One example involves calling or messaging on a particular action provider. If sufficient information is available, the task can be assigned to the explicitly specified action provider. If the action provider is not registered, an offer to register the provider can be presented (e.g., "Would you like me to register <provider> as a messaging service?"). If an affirmative reply is received, registration can proceed.

Similarly, if the action provider is not installed, an offer to install the action provider can be presented.

For example, the utterance "Call <Contact name> on <Provider>" can result in checking if the contact has acceptable contact information for the provider stored on or available to the device. Some providers require a provider-specific identifier. If the identifier is available, the call can proceed. If not, a different action provider can be offered and/or the digital personal assistant can ask for the contact information (e.g., "Do you know Dan's Skype ID?").

If a prerequisite fails (e.g., the service supporting the provider is down), the process can fall back to the next action provider, which is assigned the task.

In some cases, too much information can be specified, indicating a mismatch in expected information that causes the task to fail. For example, some calling applications may not accept a phone type (e.g., "home"). So, an utterance to "Call <contact name> on <provider> home," is nonsensical to the provider, so it can fail or fall back to another call application (e.g., carrier's) and look for a home number. The digital personal assistant can call the home number or offer to call the home number.

As described herein, explicit specification of an action provider can lead to machine learning that make the action provide the default for a task, contact, or the like.

Example 27—Example Scenarios: No Explicit Specification of Action Provider

In any of the examples herein, a wide variety of scenarios can be supported in which the utterance does not include explicit specification of an action provider.

For example, if a task is simply specified, the task can be assigned to the preferred action provider for the task. If there is no preferred provider, a query can be placed to determine which provider to use.

If the preferred action provider is not available, the task can be assigned to a secondary or fallback provider that supports the task.

If information necessary to complete the task is only available for a particular action provider, the task can be assigned to the particular action provider. For example, in a calling or messaging scenario, if contact information is only available for a particular action provider, the task can be assigned to the particular action provider.

Example 28—Example Triggered Content

In any of the examples herein, an action provider can specify that information is to be communicated by the digital personal assistant infrastructure service to a user upon occurrence of a condition. For example, a boundary (e.g., geofence) can be specified so that a service communicates availability when a current location of a device falls within the boundary (e.g., enters a city, lands at airport, or the like).

During registration, the provider can specify the condition and content to be presented. Responsive to determining that the current location falls within the boundary, the message is presented by the digital personal assistant infrastructure service.

Example 29—Example Speech Recognition

In any of the examples herein, a variety of speech recognition technologies can be applied. Although voice recognition can be performed in the device as shown in some examples, an external recognizer can also be employed as appropriate.

Example 30—Example Devices

The technologies can support a rich mix of devices. For example, phones, tablets, game consoles, wearable computers, desktop, laptop, and the like can be supported.

Example 31—Example Features

Although an example of a digital personal assistant system named "Cortana" is sometimes used, the technologies can be applied to any of a variety of digital assistant systems, and the digital assistant can have any of a variety of names.

Although some examples use Microsoft technologies, other technologies can be substituted in place thereof.

Example 32—Example Features Overview

A digital personal assistant can perform a set of supported tasks. Typically the assistant will pick a default provider/application that she will work with to complete such tasks. But, different users may not prefer the same provider/application to complete the exact same task. For example, some users might prefer to use the Skype service for their VOIP calls, while others might prefer to use the GTalk service for their VOIP calls.

In any of the examples herein, an application can be one that is installed locally on the device, a web service that can be remotely accessed from the device, or the like.

A digital personal assistant can understand and adapt to user's preferences and can work with the provider/application of user's choice to complete a task as long as the requested application can complete the requested task and has registered with the personal assistant. The technologies can solve problems by providing a platform and schema that allow applications to register as providers for tasks that a digital personal assistant can perform.

Third parties can extend the functionality of the digital personal assistant as described herein. An application can register as a digital personal assistant action provider.

Users prefer choice when it comes to using apps to complete specific tasks. For some users, the WhatsApp app would be the preferred app for messaging experiences, and some would rely on Skype to make their video calls. Third-party application developers can register with a Reactive Agent Framework to fulfill specific Cortana actions.

Example 33—Example Speech and Text Input Platform

Although some of the examples herein mention a "Reactive Agent Framework," any speech and text input platform to fulfill user requests via a digital personal assistant can be used.

Example 34—Example Functionality

Various functionality can be provided. For example, the technology can allow applications to register as providers for tasks that a digital personal assistant can perform for the user (e.g., calling, texting, taking notes, etc.).

A schema can be defined for common actions and tasks that a digital personal assistant could perform.

Applications that have registered as task providers can provide a response back to the user via the digital personal assistant.

Applications can provide a response when the requested task has been received, when it is being acted upon, and the outcome (success/failure) can be indicated.

Applications can include a variety of information in their response to the digital personal assistant, including display text, text to be read aloud, a deep link back into the application, a link to a webpage/website, HTML web content to be rendered by the personal assistant, etc.

Example 35—Example Speech and Text Input Platform

Task categories can have a default application that Cortana will use to complete a task. In examples, this is called the "system-default-app" for a task.

When a user uninstalls an application that they have selected as the default/preferred for a task, the system-default-app for the task can be reset as the new default/preferred application for that task.

An application can register for more than one Cortana task. For example, an application can support both audio calls and video chat, or the like.

Example 36—Example Scenario

Cortana knows a user's apps. A user can choose which apps to use for Cortana tasks like notes, calling, and messaging.

For example, Eric is an ardent fan of WhatsApp and prefers to use it over the carrier-supported SMS experience on his phone. He can choose to use the WhatsApp app as the default messaging app on his phone (e.g., via the user interface of FIG. 8 as described). Although the example could use WhatsApp and Skype as examples, in practice, any number of other applications (e.g., action providers) can be used.

In the example, the WhatsApp app (e.g., a third-party app) leverages and participates in the task provider infrastructure.

Example 37—Example Features

The described technology can be a feature of Reactive Agent Framework available to any device that ships Cortana. The feature can work for both typing & speech interactions with Cortana.

A scheme can be defined for Cortana actions: Intents×slot definition for actions. A prioritized list of actions (domain× intent) and associated list of slots that can be exposed per action can be supported.

So, for example, for messaging, the intents can be "send." Slots can include contact first name, contact last name, message.

For calling, the intents can be "call." Slots can include contact first name, contact last name, phone number, phone type.

For email, the intents can be "send." Slots can include recipient address, subject, message, priority, cc list, bcc list.

For notes, the intents can be "create." The slots can include the message.

For navigation, the intents can be "navigate." Slots can include Location address, Location GPS coordinates.

For calendar (appointments), the intents can be create, review, update. Slots can include title, message, date-time, invitees, location address, and location GPS coordinates.

The service Intent×slot information can be mapped to an on-device action schema.

On device reactive agents, a generic, platform dependent implementation can be offered for supported on-device actions. This is the system-default-app for Cortana tasks.

Generic, platform dependent implementation can be implemented for an on-device action to be overridden by user choice. Such can enable extending Cortana task completion actions for agents.

Task completion actions raised by on-device reactive agents can be routed through to appropriate user-selected task provider.

The Cortana user experience can query and pick up registered action providers to surface in settings/notebook user experience.

A mechanism for applications can be provided to register a set of entities for specific slots across the list of actions they are registering for. For example, applications can register their list of contacts when they register for the Call action.

Slot values recognized by the flow can be made available to the task provider even if the provider will not need a specific slot. For example, Skype might not find the phone type slot useful.

When a user uninstalls an application they have selected as the default/preferred for a task, the system-default-app for the task can be reset as the new default/preferred application for that task.

A mechanism by which applications can update the slot values for the actions they have registered for can be provide. For example, Skype might want to update the list of contacts registered with us when user adds/removes a contact when using Skype.

Example 38—Example Features: Registration

Various registration functionality can be supported. Third-party applications can register with the Reactive Agent Framework to handle Cortana actions. An application can register for more than one action. Per device, a service (personalization) can know the list of applications that are registering for specific actions. Reactive Agent Framework can initiate upload of this information to the service.

A registering application (per unique appID) can optionally specify a string as name identifier (e.g. Skype Mobile app could register for "Skype" as the identifier). When this is not provided, the application's name as it appears in start menu can be used as the default.

Example 39—Example Features: Selecting/Updating a Task Provider

Cortana can query the list of registered providers for a task completion action.

Users can select the default task provider for each action from within Cortana settings.

Example 40—Example Features: Invocation

Applications can handle invocations for task completion actions either on a foreground task or in a background task.

User can start using a provider to complete a task by including the provider's name in the speech utterance or in the typed text.

For example, "Call mom on Skype" can use Skype to complete the action. "Call mom" can use the system-default-provider calling app to complete the action unless the user has set Skype as the default provider for calling.

Invocations can be acknowledged within a time threshold (e.g., 5 seconds). If not, the task can be considered to have timed-out. Cortana can present a "Sorry. <appName> is not responding. Let me try this using <system-default-provider>" and will attempt to complete the task using the system-default-provider.

If the user-requested app is not available on the system, Cortana can present the user the disambiguation user interface with the list of apps registered to handle that action with a link to "look for apps in the store." A user can use flexible selection to pick the app they want to complete the action or look for an app in the store.

The system can infer, based on past usage which provider to use for a specific action type for a specific contact. The system can learn the user's habits and patterns based on their usage behavior. The user can override the learned behavior as desired.

For example, if WhatsApp is the user's preferred provider for messaging and the user has always used the SMS app to message John, then the system can associate the SMS app to be the default provider to message John after n (e.g., 10 or the like) occurrences.

Inferred providers can be shown to the user via Cortana notebook (e.g., in a preference setting user interface or the like).

Tips for specific Cortana actions which have registered third party providers can include tips suggesting usage with the provider name. For example, "Try call John on Skype" can be shown if Skype is the registered provider for calling action

Example 41—Example Features: Discover—In Store and within Cortana

The technologies can help users discover app providers from within the Application store.

The technologies can help users discover and use app providers from within Cortana. When a user installs an app that also registers as a provider for a Cortana action, the user can be informed.

Example 42—Example Computing Systems

Figure 9:
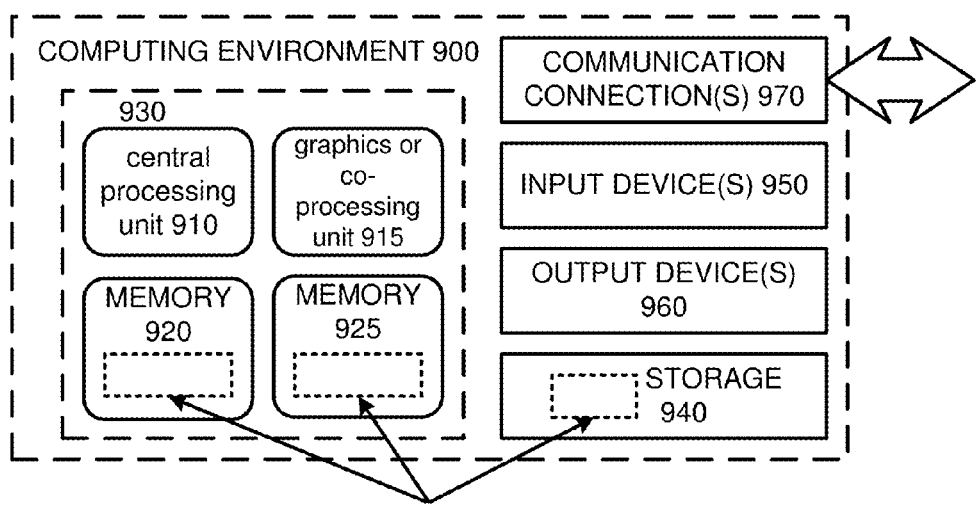
FIG. 9 is a diagram of an example computing system in which some described embodiments can be implemented.

FIG. 9 illustrates a generalized example of a suitable computing system or environment 900 in which several of the described innovations may be implemented. The computing system 900 is not intended to suggest any limitation as to scope of use or functionality, as the innovations may be implemented in diverse general-purpose or special-purpose computing systems. A mobile device, wearable device, or other devices as described herein can take the form of the described computing system 900.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 can store software 980 implementing one or more innovations described herein, in the form of computer-executable instructions suitable for execution by the processing unit(s).

A computing system may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing system 900. The storage 940 can store instructions for the software 980 implementing one or more innovations described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system 900, computer-readable media include memory 920, 925, storage 940, and combinations of any of the above.

The innovations can be described in the general context of computer-executable instructions, such as those included in program modules, being executed in a computing system on a target real or virtual processor (e.g., which is ultimately executed in hardware). Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 43—Example Mobile Device

Figure 10:
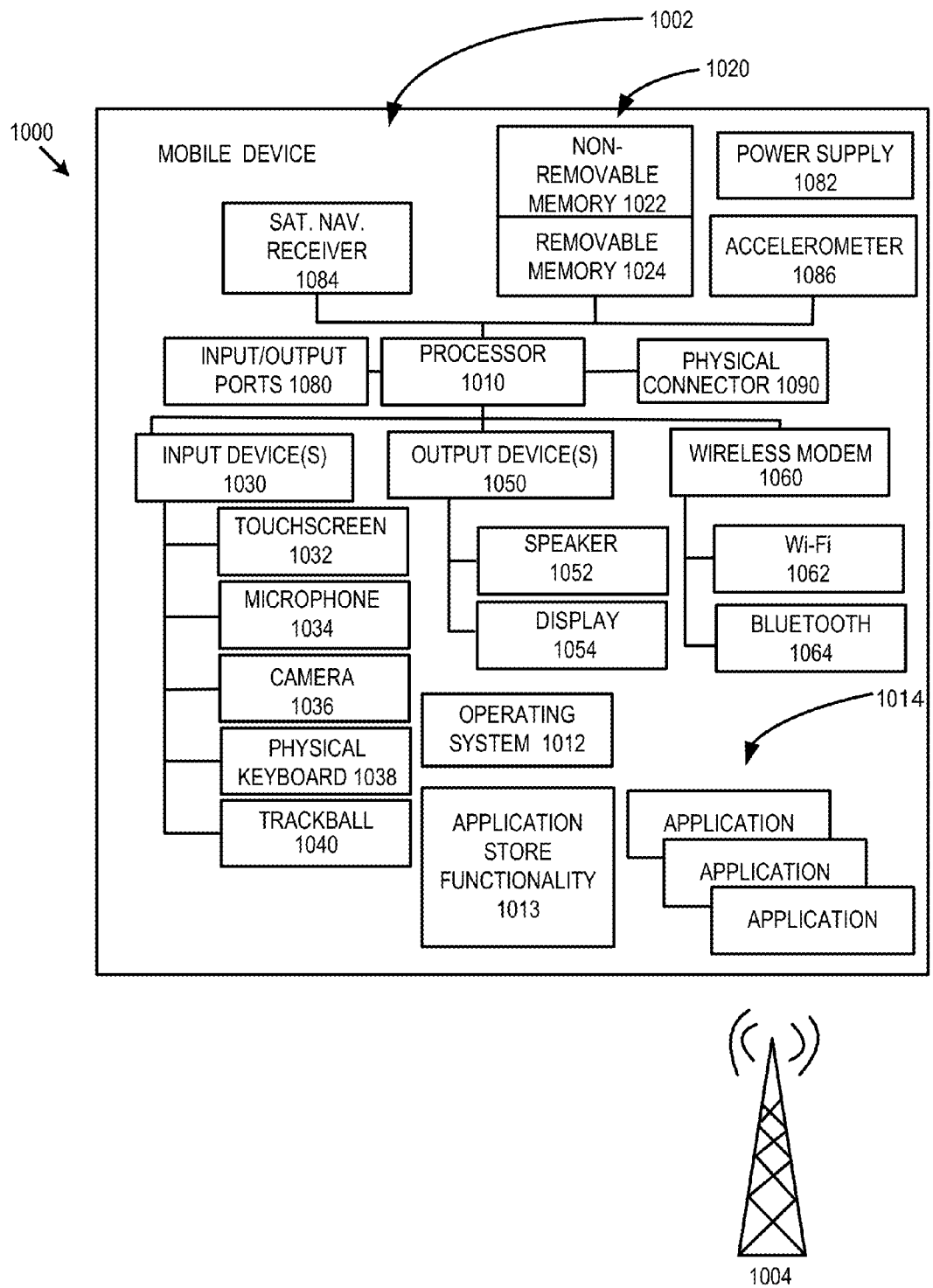
FIG. 10 is an example mobile device that can be used for the technologies described herein.

In any of the examples herein, a device can take the form of a mobile device. FIG. 10 is a system diagram depicting an example mobile device 1000 including a variety of optional hardware and software components, shown generally at 1002. Any components 1002 in the mobile device can communicate with any other component, although not all connections are shown, for ease of illustration. The mobile device can be any of a variety of mobile computing devices (e.g., cell phone, smartphone, tablet, handheld computer, drone, Personal Digital Assistant (PDA), etc.) and can allow wireless two-way communications with one or more mobile communications networks 1004, such as a cellular, satellite, or other network. Voice over IP scenarios (e.g., over Wi-Fi or other network) can also be supported. The communication devices described herein can take the form of the described mobile device 1000.

The illustrated mobile device 1000 can include a controller or processor 1010 (e.g., signal processor, microprocessor, ASIC, or other control and processing logic circuitry) for performing such tasks as signal coding, data processing, input/output processing, power control, and/or other functions. An operating system 1012 can control the allocation and usage of the components 1002 and support for one or more application programs 1014. The application programs 1014 can include common mobile computing applications (e.g., email applications, calendars, contact managers, web browsers, messaging applications), or any other computing application. Functionality 1013 for accessing an application store can also be used for acquiring and updating applications 1014.

The illustrated mobile device 1000 can include memory 1020. Memory 1020 can include non-removable memory 1022 and/or removable memory 1024. The non-removable memory 1022 can include RAM, ROM, flash memory, a hard disk, or other well-known memory storage technologies. The removable memory 1024 can include flash memory or a Subscriber Identity Module (SIM) card, which is well known in GSM communication systems, or other well-known memory storage technologies, such as "smart cards." The memory 1020 can be used for storing data and/or code for running the operating system 1012 and the applications 1014. Example data can include web pages, text, images, sound files, video data, or other data sets to be sent to and/or received from one or more network servers or other devices via one or more wired or wireless networks. The memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1000 can support one or more input devices 1030, such as a touch screen 1032, microphone 1034, camera 1036, physical keyboard 1038 and/or trackball 1040 and one or more output devices 1050, such as a speaker 1052 and a display 1054. Other possible output devices (not shown) can include piezoelectric or other haptic output devices. Some devices can serve more than one input/output function. For example, touchscreen 1032 and display 1054 can be combined in a single input/output device.

A wireless modem 1060 can be coupled to an antenna (not shown) and can support two-way communications between the processor 1010 and external devices, as is well understood in the art. The modem 1060 is shown generically and can include a cellular modem for communicating with the mobile communication network 1004 and/or other radio-based modems (e.g., Bluetooth 1064, Wi-Fi 1062, or the like). The wireless modem 1060 is typically configured for communication with one or more cellular networks, such as a GSM or CDMA network for data and voice communications within a single cellular network, between cellular networks, or between the mobile device and a public switched telephone network (PSTN).

The mobile device 1000 can further include at least one input/output port 1080, a power supply 1082, a satellite navigation system receiver 1084, such as a Global Navigation Satellite System (GNSS) (e.g., Global Positioning System (GPS) receiver, an accelerometer 1086, and/or a physical connector 1090, which can be a USB port, IEEE 1394 (FireWire) port, and/or RS-232 port. The illustrated components 1002 are not required or all-inclusive, as any components can be deleted and other components can be added.

Example 44—Example Cloud-Supported Environment

Figure 11:
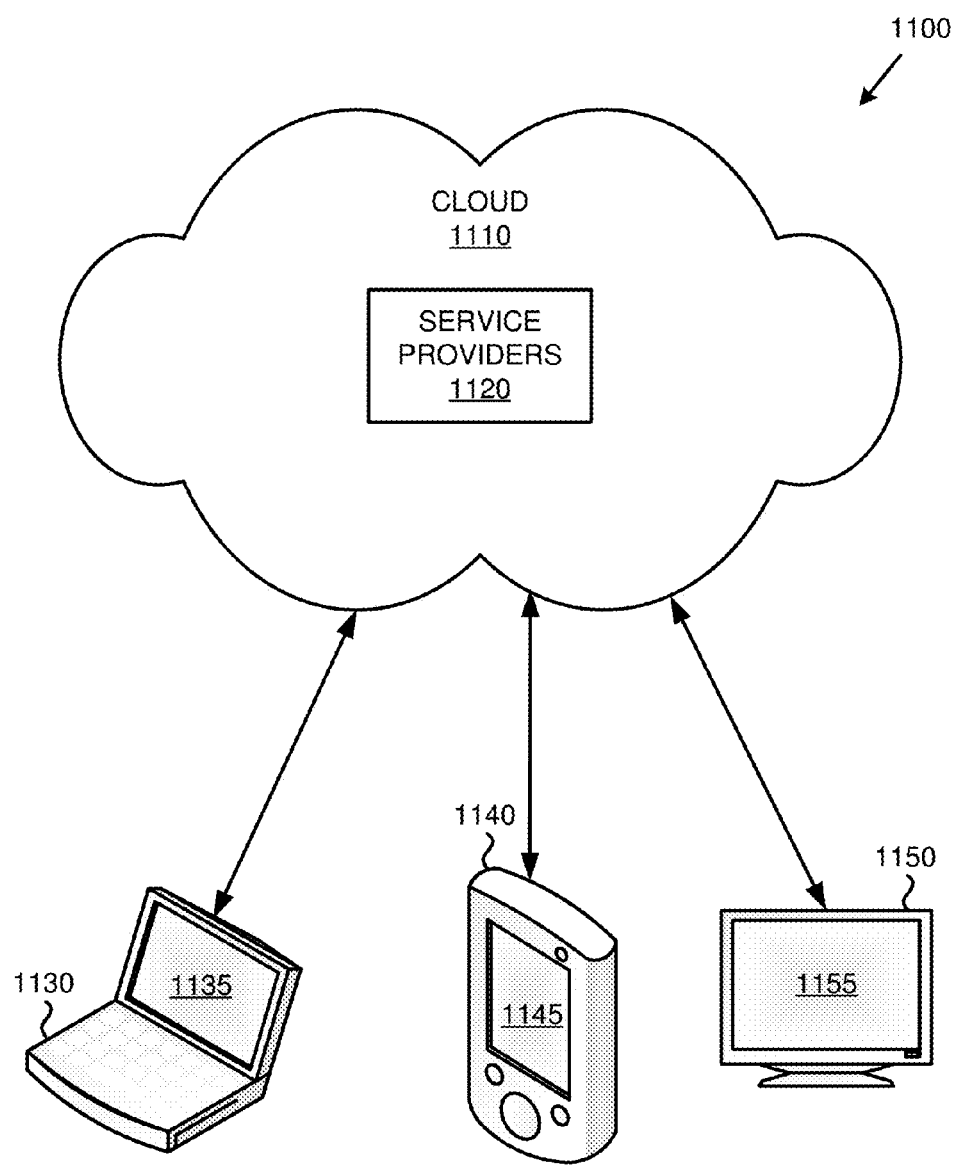
FIG. 11 is an example cloud-support environment that can be used in conjunction with the technologies described herein.

In example environment 1100 of FIG. 11, the cloud 1110 provides services for connected devices 1130, 1140, 1150 with a variety of screen capabilities. Connected device 1130 represents a device with a computer screen 1135 (e.g., a mid-size screen). For example, connected device 1130 could be a personal computer such as desktop computer, laptop, notebook, netbook, or the like. Connected device 1140 represents a device with a mobile device screen 1145 (e.g., a small size screen). For example, connected device 1140 could be a mobile phone, smart phone, personal digital assistant, tablet computer, and the like. Connected device 1150 represents a device with a large screen 1155. For example, connected device 1150 could be a television screen (e.g., a smart television) or another device connected to a television (e.g., a set-top box or gaming console) or the like. One or more of the connected devices 1130, 1140, 1150 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1100. For example, the cloud 1110 can provide services for one or more computers (e.g., server computers) without displays.

Services can be provided by the cloud 1110 through service providers 1120, or through other providers of online services (not depicted). For example, cloud services can be customized to the screen size, display capability, and/or touch screen capability of a particular connected device (e.g., connected devices 1130, 1140, 1150).

In example environment 1100, the cloud 1110 provides the technologies and solutions described herein to the various connected devices 1130, 1140, 1150 using, at least in part, the service providers 1120. For example, the service providers 1120 can provide a centralized solution for various cloud-based services. The service providers 1120 can manage service subscriptions for users and/or devices (e.g., for the connected devices 1130, 1140, 1150 and/or their respective users).

Example 45—Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Non-Transitory Computer-Readable Media

Any of the computer-readable media herein can be non-transitory (e.g., memory, magnetic storage, optical storage, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computing system to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, or the like). Such instructions can cause a computer to perform the method.

Other Embodiments

Clause 1. A method of controlling which action provider out of a plurality of registered action providers performs a task, the method comprising:

receiving a spoken utterance detected by a microphone;

performing speech recognition on the spoken utterance, the speech recognition recognizing a task in the spoken utterance; and responsive to recognizing the task and based on stored registrations for the registered action providers and stored task-to-provider association preferences, assigning the task to a particular action provider out of the registered action providers, wherein assigning the task comprises choosing the particular action provider to perform the task and sending instructions to perform the task to the particular action provider.

Clause 2. The method of clause 1 further comprising:

determining that a prerequisite for an action provider is not satisfied; and responsive to determining that the prerequisite for the action provider is not satisfied, identifying a secondary action provider for the task, and using the secondary action provider as the particular action provider for performing the task.

Clause 3. The method of clause 2 wherein:

the prerequisite specifies that a network connection is present.

Clause 4. The method of any of clauses 1-3 wherein:

the task-to-provider association preferences indicate a preferred action provider for the task; and choosing the particular action provider to perform the task comprises choosing the preferred action provider for the task.

Clause 5. The method of any of clauses 1-4 further comprising:
receiving an utterance comprising an explicit indication of a second action provider and the task; and
responsive to recognizing the explicit indication of the second action provider, sending instructions to perform the task to the second action provider.

Clause 6. The method of any of clauses 1-5 further comprising:
based on the stored registration for the particular action provider, determining that a parameter slot for the task is missing; and
before sending instructions to the particular action provider, prompting for a parameter value to fill the parameter slot;
receiving another spoken utterance;
performing speech recognition on the other spoken utterance, the speech recognition recognizing a spoken parameter value; and
submitting the spoken parameter value to the particular action provider when assigning the task to the particular action provider.

Clause 7. The method of any of clauses 1-6 wherein:
the speech recognition further recognizes a parameter value in the spoken utterance; and
assigning the task to the particular action provider further comprises sending the parameter value to the action provider.

Clause 8. The method of any of clauses 1-7 further comprising:
registering the particular action provider with a digital personal assistant infrastructure service, wherein the registering comprises storing an indication of one or more actions supported by the particular action provider.

Clause 9. The method of any of clauses 1-8 wherein:
the registered action providers comprise a non-native action provider and a native action provider.

Clause 10. The method of any of clauses 1-9 further comprising:
via machine learning, determining that the particular action provider is a preferred action provider for the task; and
changing the preferred action provider for the task to be the particular action provider.

Clause 11. The method of any of clauses 1-10 wherein:
performing speech recognition on the spoken utterance comprises recognizing, in the utterance, a contact name of a contact;
the task comprises a communication task; and
assigning the particular action provider to perform the task comprises initiating communication with the contact via the communication task with the particular action provider.

Clause 12. The method of clause 11 further comprising:
via machine learning, determining that the particular action provider is a preferred action provider for the task and contact; and
changing the preferred action provider for the task and contact to be the particular action provider.

Clause 13. The method of any of clauses 1-12 further comprising:
responsive to determining that no registered action provider supports the task, identifying an action provider that supports the task, installing the action provider that supports the task, and registering the action provider that supports the task.

Clause 14. The method of any of clauses 1-13 wherein:
the stored registration for the particular registered action provider indicates that a message is to be presented when a current location falls within a boundary; and
the method further comprises, responsive to determining that the current location falls within the boundary, presenting the message.

Clause 15. The method of any of clauses 1-14 further comprising:
performing the task with the particular action provider.

Clause 16. An electronic device comprising:
a processor;
memory storing a plurality of stored registrations for registered action providers, wherein the stored registrations comprise a stored registration for a particular registered action provider indicating a task supported by the particular registered action provider;
memory storing a plurality of stored preferences for registered action providers, wherein the stored preferences comprise a preference indicating a particular registered action provider as preferred for a particular task;
a recognition engine configured to recognize a task in a spoken utterance received by a microphone of the device or a typed command received by text input hardware of the device; and
a personal digital assistant infrastructure service configured to control to which action provider the task is directed for completion based on the stored registrations and the stored preferences.

Clause 17. The electronic device of clause 16 wherein:
the stored registration for the particular registered action provider comprises a prerequisite condition for the task supported by the particular registered action provider; and
the digital personal assistant infrastructure service is configured to evaluate the prerequisite condition and choose a different action provider if the prerequisite is not met.

Clause 18. The electronic device of clause 17 wherein:
the prerequisite condition specifies that a data connection is present.

Clause 19. The electronic device of any of clauses 16-18 wherein:
the personal digital assistant infrastructure service supports explicit override of a preferred action provider for the task.

Clause 20. One or more machine-readable media comprising machine-executable instructions causing an electronic device to perform a method controlling which communication action provider out of a plurality of registered communication action providers perform a communication task supported by a digital personal assistant infrastructure service, the method comprising:
performing speech recognition on an utterance, the speech recognition comprising recognizing the supported communication task and a contact name in the utterance; and
based on stored registrations for the registered communication action providers, stored action-to-provider association preferences, and availability of contact information for initiating the communication task for the contact name, choosing a particular registered communication action provider, and initiating communication with a contact identified by the contact name using the selected particular registered communication action provider via the supported communication task;

wherein choosing a particular registered communication action provider comprises initially considering a first communication action provider, but choosing a second communication action provider responsive to determining that availability of contact information for the first communication action provider is missing.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A method of controlling which action provider out of a plurality of different registered action providers performs a task, the method comprising:
receiving a spoken utterance detected by a microphone;
performing speech recognition on the spoken utterance, the speech recognition recognizing a task in the spoken utterance; and
responsive to and after recognizing the task in the spoken utterance and based on stored registrations for the different registered action providers and stored task-to-provider association preferences, assigning the task in the spoken utterance to a particular action provider out of the different registered action providers, wherein a plurality of the different registered action providers are currently registered for the task in the spoken utterance and the plurality of different registered action providers currently registered for the task in the spoken utterance comprise a default action provider registered for the task in the spoken utterance and a secondary action provider registered for the task in the spoken utterance, and wherein assigning the task in the spoken utterance comprises choosing, from the plurality of different registered action providers currently registered for the task in the spoken utterance, the particular action provider to perform the task in the spoken utterance and sending instructions to perform the task in the spoken utterance to the particular action provider;
wherein choosing the particular action provider to perform the task in the spoken utterance supports explicit override of the default registered action provider for the task based on an explicit indication of a name of the secondary action provider in the spoken utterance, even though the default action provider and the secondary action provider are both currently registered for the task.

2. The method of claim 1 further comprising:
determining that a prerequisite for an action provider is not satisfied; and
responsive to determining that the prerequisite for the action provider is not satisfied, identifying the secondary action provider for the task, and using the secondary action provider as the particular action provider for performing the task.

3. The method of claim 2 wherein:
the prerequisite specifies that a network connection is present.

4. The method of claim 1 wherein:
the task-to-provider association preferences indicate a preferred action provider for the task; and
choosing the particular action provider to perform the task comprises choosing the preferred action provider for the task.

5. The method of claim 1, wherein the assigning assigns the task to the default action provider, the method further comprising:
receiving an utterance comprising an explicit indication of a non-default action provider also registered for the task and a second instance of the task, wherein the explicit indication of the non-default action provider comprises a name of the non-default action provider; and
responsive to recognizing the explicit indication of the non-default action provider, sending instructions to perform the second instance of the task to the non-default action provider, even though the default action provider is also registered for the task, wherein the non-default action provider is different from the default action provider.

6. The method of claim 1 further comprising:
based on a stored registration for the particular action provider, determining that a parameter slot for the task is missing; and
before sending instructions to the particular action provider, prompting for a parameter value to fill the parameter slot;
receiving another spoken utterance;
performing speech recognition on the other spoken utterance, the speech recognition recognizing a spoken parameter value; and
submitting the spoken parameter value to the particular action provider when assigning the task to the particular action provider.

7. The method of claim 1 wherein:
the speech recognition further recognizes a parameter value in the spoken utterance; and
assigning the task to the particular action provider further comprises sending the parameter value to the particular action provider.

8. The method of claim 1 further comprising:
registering the particular action provider with a digital personal assistant infrastructure service, wherein the registering comprises storing an indication of one or more actions supported by the particular action provider.

9. The method of claim 1 wherein:
the plurality of registered action providers comprise a non-native action provider and a native action provider.

10. The method of claim 1 further comprising:
via machine learning, determining that the particular action provider is a preferred action provider for the task; and
changing the default action provider for the task to be the particular action provider.

11. The method of claim 1 wherein:
performing speech recognition on the spoken utterance comprises recognizing, in the utterance, a contact name of a contact;
the task comprises a communication task; and
assigning the particular action provider to perform the task comprises initiating communication with the contact via the communication task with the particular action provider.

12. The method of claim 11 further comprising:
via machine learning, determining that the particular action provider is a preferred action provider for the task and contact; and
changing the default action provider for the task to be the particular action provider when communicating with the contact.

13. The method of claim 1 further comprising:
responsive to determining that no registered action provider supports the task, identifying an action provider that supports the task, installing the action provider that supports the task, and registering the action provider that supports the task.

14. The method of claim 1 wherein:
a stored registration for the particular action provider indicates that a message is to be presented when a current location falls within a boundary; and
the method further comprises, responsive to determining that the current location falls within the boundary, presenting the message.

15. The method of claim 1 further comprising:
performing the task with the particular action provider.

16. An electronic device comprising:
one or more processors;
memory storing a plurality of stored registrations for registered action providers, wherein the stored registrations comprise a stored registration for a particular registered action provider indicating a calling task supported by the particular registered action provider, wherein a plurality of the registered action providers are registered for the calling task;
memory storing a plurality of stored preferences for registered action providers, wherein the stored preferences comprise a preference indicating a preferred registered action provider as preferred for a particular calling task, and a second registered action provider is also registered for the particular calling task;
memory storing computer-executable instructions that, when executed, cause the one or more processors to:
recognize a calling task in a spoken utterance received by a microphone of the electronic device or a typed command received by text input hardware of the electronic device; and
control to which action provider the calling task is directed for completion based on the plurality of stored registrations and the stored preferences, and wherein directing the calling task comprises choosing, from the registered action providers registered for the calling task, the particular registered action provider to perform the calling task and sending instructions to perform the calling task to the particular registered action provider;
wherein:
explicit override of the preferred registered action provider for the calling task is supported based on an explicit indication of a name of the second registered action provider in a received utterance or received typed text, even though the preferred registered action provider and the second registered action provider are both currently registered for the task in the spoken utterance.

17. The electronic device of claim 16 wherein:
the stored registration for the preferred registered action provider comprises a prerequisite condition for the calling task supported by the preferred registered action provider; and
the computer-executable instructions comprise instructions that, when executed, cause the one or more processors to:
evaluate the prerequisite condition and choose a different action provider if the prerequisite condition is not met.

18. The electronic device of claim 17 wherein:
the prerequisite condition specifies that a data connection is present.

19. One or more memories, magnetic storage media, or optical storage media comprising machine-executable instructions causing an electronic device to perform a method controlling which communication action provider out of a plurality of registered communication action providers perform a communication task supported by a digital personal assistant infrastructure service, the method comprising:
performing speech recognition on an utterance, the speech recognition comprising recognizing the supported communication task and a contact name in the utterance; and
based on stored registrations for the registered communication action providers, stored action-to-provider association preferences, and availability of contact information for initiating the communication task for the contact name, choosing a particular registered communication action provider, and initiating communication with a contact identified by the contact name using the chosen particular registered communication action provider via the supported communication task;
wherein choosing a particular registered communication action provider comprises initially considering a first communication action provider, but choosing a second communication action provider responsive to determining that availability of contact information for the first communication action provider is missing.

20. The one or more memories, magnetic storage media, or optical storage media of claim 19 wherein the method further comprises:
specifying a contract registration for the second communication action provider for a contract associated with the communication task, wherein the contract registration extends a virtual digital assistant.

* * * * *